United States Patent [19]
Perry

[11] Patent Number: 6,085,250
[45] Date of Patent: Jul. 4, 2000

[54] METHOD AND SYSTEM FOR USING LAYERED NETWORKING APPLICATION PROGRAM INTERFACES (APIS) USING A NATIVE ASYNCHRONOUS TRANSFER MODE (ATM) API

[75] Inventor: William A. Perry, Carrollton, Tex.

[73] Assignee: Efficient Networks, Inc., Dallas, Tex.

[21] Appl. No.: 08/822,344

[22] Filed: Mar. 20, 1997

[51] Int. Cl.[7] .............................. G06F 13/38; G06F 15/17
[52] U.S. Cl. .......................... 709/230; 709/231; 709/239; 709/229
[58] Field of Search .................................... 370/397, 255, 370/232; 709/228, 230, 231, 239, 229

[56] References Cited

U.S. PATENT DOCUMENTS

| | | | |
|---|---|---|---|
| 5,231,631 | 7/1993 | Buhrke et al. | 370/60 |
| 5,274,768 | 12/1993 | Traw et al. | 395/275 |
| 5,280,476 | 1/1994 | Kojima et al. | 370/60.1 |
| 5,311,509 | 5/1994 | Heddes et al. | 370/60 |
| 5,379,297 | 1/1995 | Glover et al. | 370/60.1 |
| 5,381,411 | 1/1995 | Ohno et al. | 370/60 |
| 5,414,707 | 5/1995 | Johnston et al. | 370/79 |
| 5,420,858 | 5/1995 | Marshall et al. | 370/60.1 |
| 5,430,721 | 7/1995 | Dumas et al. | 370/60.1 |
| 5,455,826 | 10/1995 | Ozveren et al. | 370/60 |
| 5,490,141 | 2/1996 | Lai et al. | 370/60.1 |
| 5,535,197 | 7/1996 | Cotton | 370/60 |
| 5,548,587 | 8/1996 | Bailey et al. | 370/60.1 |
| 5,557,607 | 9/1996 | Holden | 370/58.2 |
| 5,568,486 | 10/1996 | Huscroft et al. | 370/94.2 |
| 5,572,522 | 11/1996 | Calamvokis et al. | 370/60.1 |
| 5,583,861 | 12/1996 | Holden | 370/395 |
| 5,592,476 | 1/1997 | Calamvokis et al. | 370/390 |
| 5,600,650 | 2/1997 | Oskouy | 370/468 |
| 5,602,853 | 2/1997 | Ben-Michael et al. | 370/474 |
| 5,617,416 | 4/1997 | Damien | 370/391 |
| 5,625,625 | 4/1997 | Oskouy et al. | 370/395 |
| 5,629,937 | 5/1997 | Hayter et al. | 370/233 |
| 5,701,292 | 12/1997 | Chiussi et al. | 370/232 |
| 5,726,985 | 3/1998 | Daniel et al. | 370/382 |
| 5,732,071 | 3/1998 | Saito et al. | 370/255 |
| 5,742,765 | 4/1998 | Wong et al. | 395/200.6 |
| 5,745,477 | 4/1998 | Zeng et al. | 370/230 |
| 5,751,709 | 5/1998 | Rathnavelu | 370/395 |
| 5,790,809 | 7/1998 | Holmes | 709/228 |
| 5,818,842 | 10/1998 | Burwell et al. | 370/397 |
| 5,822,521 | 10/1998 | Gartner et al. | 709/230 |
| 5,852,655 | 12/1998 | McHale et al. | 379/93.14 |
| 5,898,669 | 4/1999 | Shimony et al. | 370/232 |

FOREIGN PATENT DOCUMENTS

| | | | |
|---|---|---|---|
| 0130260 | 1/1985 | European Pat. Off. | H04L 5/14 |
| 0325794 | 12/1988 | European Pat. Off. | H04Q 11/04 |
| 9807282 | 4/1998 | WIPO . | |

OTHER PUBLICATIONS

Computer Networks, by Andrew S. Tanenbaun (second edition), Prentice Hall, 1989.
Newton's Telecom Dictionary by Harry Newton, 1997.
Wireless ATM LAN with and without infrastructure, IEEE Communication Magazine, Yonggang Du et al., Apr. 1998.
Moving toward ATM: LAN/WAN evolution and experimentation at the university of oregon, IEEE Communication Magazine, Randolph G. Foldvik, Apr. 1998.
"Traffic Management Specification Version 4.0" (af–tm–0056.000), *The ATM Forum Technical Committee*, Apr., 1996, 107 pages.
"Universal Serial Bus Class Definitions for Communication Devices," Verion 1.1, *USB Implementers' Forum*, Jan. 19, 1999, 110 pages.
"ATM over ADSL Recommendations," *ADSL Forum Technical Report TR–002*, Mar. 1997, 23 pages.
"Framing and Encapulations Standards for ADSL: Packet Mode," *ADSL Forum WT–004 v3.0 Technical Report*, Mar. 1997, 16 pages.

*Primary Examiner*—Zarni Maung
*Assistant Examiner*—Mahmanzar Moezz
*Attorney, Agent, or Firm*—Baker Botts L.L.P.

[57] ABSTRACT

This invention provides a system for transparently mapping user level non-asynchronous transfer mode (ATM) sockets to an ATM virtual channel circuit associated with an operating system of a computer workstation and includes an ATM middleware subsystem for receiving a plurality of ATM extension calls from a non-ATM aware application and translating the plurality of ATM extension calls to a plurality of native ATM API calls. A configuration data base stores translation data for translating the ATM extension calls from the non-ATM application to the native ATM API calls. A WinSocket™ application receives the native ATM API calls from the ATM middleware subsystem and responsively generates signals for controlling the operating system according to the contents of the native ATM API calls. The ATM middleware system further generates formatted calls to the operating system from the plurality of ATM extension calls according to preexisting protocols associated with the operating system.

19 Claims, 1 Drawing Sheet

METHOD AND SYSTEM FOR USING LAYERED NETWORKING APPLICATION PROGRAM INTERFACES (APIS) USING A NATIVE ASYNCHRONOUS TRANSFER MODE (ATM) API

TECHNICAL FIELD OF THE INVENTION

The present invention relates to telecommunications technology in the electronics transmission of information and, more particularly, to a method and system for providing layered networking APIs using the ATM control plane API for transparently mapping user sockets to ATM virtual channel circuits.

BACKGROUND OF THE INVENTION

In the development of application program interface programs (APIs) supporting asynchronous transfer mode (ATM) connection management, existing network API models, such as UNIX sockets APIs and System V Release 4 ("SVR4") transport layer interface (TLI) APIs may be used to develop a wide variety of client/server applications. Implementations of the sockets API libraries exist for the popular operating systems including BSD UNIX® (BSD) and SVR4 UNIX®, DOS/Windows®, Windows NT® and Systems 7®. The SVR4 TLI API may also provide a signal interface for ATM applications.

Providing a socket simulation API function library for ATM would assist the migration of existing network applications to a non-Internet Protocol (IP) ATM environment. However, without definition of an underlying entity or API layer to manage ATM Switch Virtual Circuits(SVCs), modifications to the sockets API would be extensive and require application writers to learn and work with ATM concepts foreign to the existing IP environment.

Another existing limitation with known interfaces is that, for non-native ATM systems, such as LAN Emulation, RFC-1483 and RFC-1577 systems, there is no quality of service (QOS) capability in virtual channels. This limitation relates to the competition for a virtual channel (VC) when two nodes attempt to communicate with each other, while at the same time they compete for network resources such as VC bandwidth and services. Without a level of QOS there is no way to determine which node should preferentially receive the VC resources while one application may be more important to the operation of a system or user than a second application. With current ATM interface technology there is no way to preferentially allocate resources on a VC. Without the ability to limit, control, and give priority to various applications, effective VC management is not possible.

Another limitation associated with current VC assignment technology for a network environment is that many APIs only address IP applications. Local area network (LAN) emulation (LANE), on the other hand, uses many different types of protocol. Because of this limitation, currently there is no way to provide a degree of QOS on a per application basis.

SUMMARY OF THE INVENTION

In light of the above-stated limitations, there is a need for method and system for providing a socket simulation environment that accommodates a wide variety of non-ATM aware applications.

There is a further need for a method and system that provides QOS, even at the virtual channel level of an ATM system.

There is a further need for a method and system that provides QOS for non-ATM aware applications.

In accordance with the present invention, a method and system for layered networking APIs using an ATM control plane API is provided that substantially eliminates or reduces disadvantages and problems associated with previously developed APIs that support ATM connection management.

According to one aspect of the present invention, there is provided a system for transparently mapping user level asynchronous transfer mode (ATM) sockets to an ATM virtual channel (VC) associated with an operating system of a computerized workstation. The present invention includes an ATM middleware subsystem for receiving a plurality of ATM extension calls from an ATM application and translating the plurality of ATM extension calls to a plurality of native ATM API calls. An ATM middleware service stores translation data for translating the ATM extension calls from the ATM application to the native ATM API calls. A Sockets application receives the native ATM API calls from the ATM middleware subsystem and responsively generates signals for controlling the operating system according to the contents of the native ATM API calls. The ATM middleware system further generates formatted calls to the operating system from the plurality of ATM extension calls according to preexisting protocols associated with the operating system.

A technical advantage that the present invention provides is a library between the user's ATM application and the standard system library. This library receives all calls that would otherwise go to the normal system library and selects applications that the library supports by remapping the received calls into other forms of calls. This provides the ability to perform socket/port native ATM features such as QOS, traffic management, and rate control features.

Another technical advantage of the present invention is that it provides a way to employ multiple APIs in a standards-based environment. This eliminates the need to have special equipment or hardware, as well as the need to rewrite any existing applications for transparently mapping user-level sockets to ATM virtual channels. Consequently, without expensive hardware, the present invention permits each VC to have its own QOS, traffic management and rate control. In addition, every user level socket can also have its own applicable QOS, traffic management and rate control features.

Another technical advantage of the present invention is that it improves LAN emulation (LANE) by providing LANE capabilities for multicast services and operations which may be critical to certain applications. For direct connections between host environments, however, the present invention permits establishing more than one VC to provide additional QOS or VCs on a "per application" basis.

Another technical advantage of the present invention is accommodation of travel distances, even great distances, between one point and another by optionally not running TCP or UDP, but simultaneously indicating to the application that TCP or UDP, as appropriate, is running. The present invention, therefore, will permit SSCOP to run at the operating system level, but with an indication to the ATM application that TCP or UDP, as appropriate, is running.

Another technical advantage of the present invention derives from its ability to deceive applications to think that standard protocols are being used. The present invention makes it possible to use a variety of applications that may be developed or may have been developed for a given protocol and use that application for a network environment that does not actually include that protocol. This permits developing and debugging of software programs in an environment different from the originally intended environment and indicate to the given ATM application that the FTDI or Ethernet® application is being used, when in fact it is not being used. This permits an ATM or NTDI application to be used in the same environment.

Still another technical advantage of the present invention is providing QOS even down to the application level. Using the conventional QOS signaling from the application, the present invention provides a way to respond reliably to the signals and provide for the given application many desired QOS levels of operation.

BRIEF DESCRIPTION OF THE DRAWINGS

For a more complete understanding of the present invention and advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
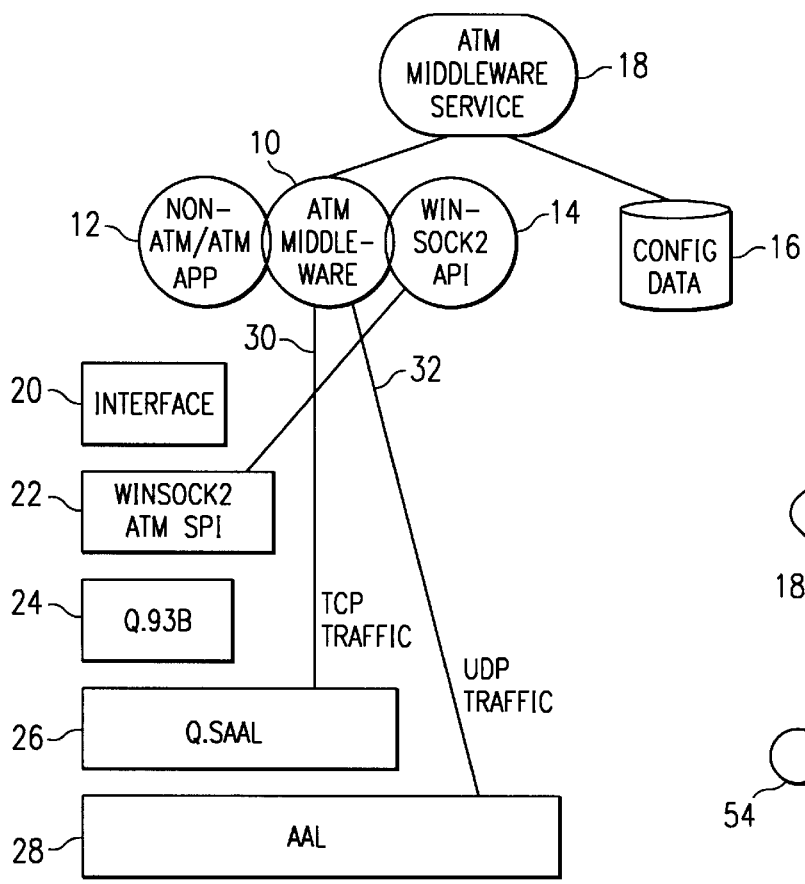
FIG. 1 illustrates an architecture for mapping TCP and UDP ports directly to the ATM environment.

FIG. 1 illustrates an architecture for mapping TCP and UDP ports to direct asynchronous transfer mode operation. In Windows NT™ environment, such as the example appearing in FIG. 1, ATM middleware 10 associates with ATM application 12 operating with TCP or UDP to monitor all system calls that may go into the preferred sockets application, such as WinSock2™ API 14 in the Windows™ NT™ environment. In a UNIX environment for example, WinSock2™ API 14 may be simply a socket library. ATM middleware 10 may include one or more dynamic link libraries (DLLs) that associate with configuration database 16 through ATM middleware service 18 for receiving translation data that determines particular paths for establishing special or dedicated virtual channels.

WinSock2™ API 14 defines ATM extensions for use within the operating system environment below interface block 20. In the present invention, WinSock2™ API 14 receives from ATM middleware 10 calls that are defined within the operating system below interface block 20. ATM middleware 10 intercepts the call from ATM applications 12 then refers to ATM middleware service 18. Depending on the data that configuration database 16 contains, ATM middleware 10 will remap the non-ATM call into native ATM calls and pass the native ATM calls to Winsock2™ API 14. From this point, all commands within and defined by Winsock2™ API 14 work as originally intended in the non-ATM environment.

Interface block 20 conceptually represents the various layers that a signal must pass through in traveling from the ATM application space to the operating system environment. This may represent, for example, various layers that exist within a given operating system or a stream of some sort that provides the necessary interface between application space and the operating system. In the Windows NT™ environment, for example, there is a transport device interface (TDI) that includes components above interface block 20 are in application space, while software components below interface layers 20 are in the operating system space.

WinSock2™ ATM SPI 22 provides a set of services for performing native ATM operations. Winsock2™ ATM SPI 22 is a service provider interface that takes the services that were defined in the APIs of ATM application 12 and directs the extensions calls and messages from ATM middleware 10 to the designated hardware drivers. Accordingly, below Winsock2™ ATM SPI 22, two separate drivers exist for controlling device traffic; i.e., Q.SAAL 26 and AAL 28. From the top view, however, Winsock2™ ATM SPI 22 provides all the SPI services desired for the native ATM services.

Q.SAAL 26 provides SSCOP functionality, which are services similar to TCP. AAL 28 receives UDP traffic to perform conventional AAL5 processing. Line 30 indicates the TCP connection from ATM middleware 10 which maps Q.SAAL 26 via Winsock2™ ATM SPI 22. ATM middleware 10 intercepts TCP calls from application 12 and maps the call to WinSock2™ API 14 as an extension call. WinSock2 API 14 then communicates to WinSock2™ ATM SPI 22. WinSock2 API 14 maps the extension call to Winsock2™ ATM SPI 22. WinSock2™ ATM SPI 22, in response to receiving the extension call, sets up in Q.93B 24 the designated virtual circuit. If a UDP call occurs, a similar operation happens with the exception that instead of passing through Q.SAAL layer 26, the extension call goes directly to AAL 28. That is, TCP traffic goes to Q.SAAL 26, while UDP traffic goes to AAL 28.

Q.SAAL 26 implements the SSCOP protocol to provide reliable data delivery as well as other functions to improve communications performance. An advantage of using SSCOP is that reliable data delivery and traffic management are separate functions, while in TCP they are combined functions.

The present invention provides, therefore, ATM middleware layer 10 that catches the normal system API network calls from application 12 and maps them to use native ATM API calls. This provides for each socket or port certain desirable native ATM features such as QOS, traffic management and rate control. In essence, therefore, the present invention provides the ability to use different non-ATM aware applications 12 and assigns to such applications a TCP traffic connection 30 or a UDP traffic connection 32 to respective Q.SAAL 26 and AAL 28 connections at the receiving end.

ATM middleware service 18 provides an interface permitting access to an ATM environment by non-ATM applications. ATM middleware service 18 includes instructions for certifying data so that any application may first register with ATM middleware service 18. ATM middleware service 18 determines whether the remote application is or is not ATM-aware. Based on this determination, ATM middleware service 18 will then determine whether to direct the application's process flow to an ATM sockets library or a non-ATM sockets library. All applications, therefore, first register with ATM middleware service 18.

Through configuration database 16, the ability to apply QOS, traffic management and rate control features for a given application ensures that better service may be applied to one application than another application depending on the relative importance, for example, of each application. The present invention permits existing binary non-ATM aware applications to receive new ATM features without modification of the binary files. Thus, an application that works satisfactorily on an Ethernet® or similar network may use the inventive concepts of the present invention to achieve this configurability for the given application.

The present invention eliminates the need to return to the specific application to include in the application the necessary instructions or access for ATM-aware applications. Thus, by using configuration ATM middleware service 18 and database 16, the present invention eliminates or substantially reduces time-consuming software programming that otherwise would be needed for functionality to be immediately available or basically transparent to the ATM application.

Another advantage of the present invention is that, while ATM application 12 may come from user and WinSock2™ 14 may be manufactured or supplied by a software vendor such as Intel Corporation, ATM middleware. 10 includes APIs that may be implemented in a user space as dynamic link libraries, shared libraries, and daemon programs. TDI interface 20, WinSock2™ ATM SPI 22, Q.93B 24, Q.SAAL 26, and AAL 28 may be supplied by a hardware vendor or other source. The present invention provides an economical way to integrate these different sources in a middleware that can effectively communicate with and use a wide variety of equipment and applications.

The present invention effectively employs the standards for UNI signaling and traffic management as well as other operations because standard extension calls from ATM application 12 are translated by ATM middleware 10 and converted to standard WinSock2™ API 14 extension calls that the operating system environment below interface block 20 may use according to accepted industry standards for the operating system. This provides a significant advantage over known approaches that use different or unique hardware systems for similar functionality.

With the present invention, ATM middleware 10 may also review the incoming data to determine the need for additional VCs based on the data that may appear in the packets transmitted. The present invention also permits the establishment of cut-through virtual channels according to whatever configuration a designer may decide. Thus, instead of having a single VC between MAC addresses, the present invention provides the ability to use multiple virtual channel circuit, for the same MAC address.

The present invention improves connectivity in the sense it can operate within stations running "standard" software program. In this method, the end station running ATM middleware software would dynamically determine whether to use the "standard" protocol such as LANE or 1577 VCs or to create and use a proprietary VC cut through, for example. The determination would be based on a number of factors such as configuration, broadcast/multi-cast, or whether the destination even supported these proprietary extensions. In essence, therefore, the present invention provides connectivity to non-ATM middleware end stations in which ATM features may be lost but also in which connectivity is preserved. Accordingly, native TCP and UDP stacks may still be used, and some ATM benefits could be offered when middleware stations talk to non-middleware stations. The present invention works with any protocol, and cut throughs can be at any layer.

The present invention has particularly beneficial uses in the context of an "intranet" system in which QOS per application can be an especially valuable control feature. This may include, for example, a form of type of packet "snooping" that ATM middleware 10 may perform. Packet snooping permits generating, for example, a multicast/no cut-through operation together with the cut-through operation 44 through ATM middleware 40.

Figure 2:
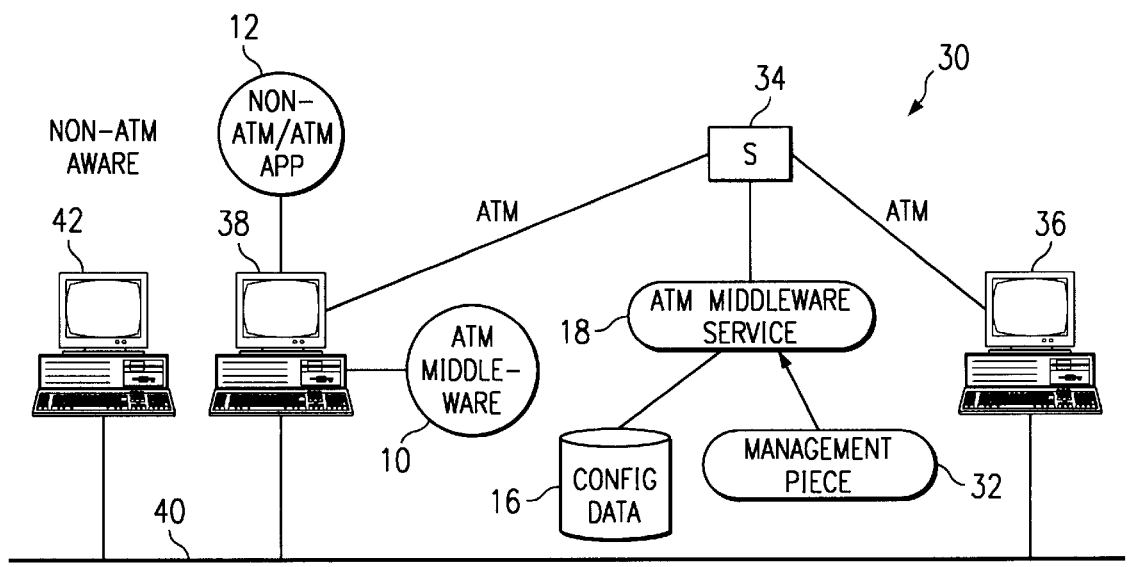
FIG. 2 illustrates use of an Ethernet® configuration for practicing certain inventive concepts of the present invention.

FIG. 2 shows an architecture 30 for implementing the teachings of the ATM middleware of the present invention. In FIG. 2, ATM middleware service 18 stores data in configuration data memory 16, and operates under the control of management piece 32. ATM switch 34 communicates with ATM-aware workstations 38 and 36, as well as ATM middleware service 18. ATM-aware workstations 38 and 36 may communicate with non-ATM aware workstation 42 via Ethernet® 40. ATM middleware workstation may, for example, be running an ATM application 12.

Management piece 32 provides instructions for controlling how ATM middleware service 18 interfaces with both ATM-aware applications and non-ATM aware applications with respective sockets libraries. When an application is running and needs to talk to a workstation such as work station 38 or 36, ATM middleware 10, using information obtained from ATM middleware service 18, controls the operation of ATM switch 34. If the workstation is non-ATM aware workstation 42, for example, ATM middleware 10 may communicate using Ethernet 40. Management entity 32 is to manually configure or override configuration database 16 managed by ATM middleware service 18.

Figure 3:
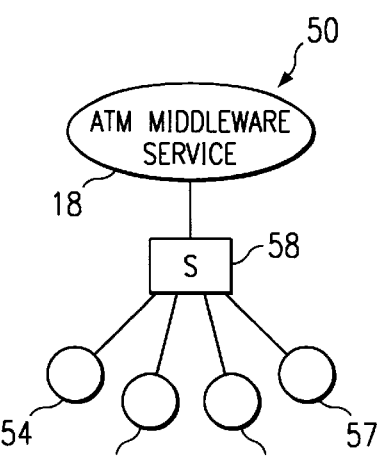
FIG. 3 illustrates the establishment of a secure local area network having multicast capability using the teachings of the present invention.

FIG. 3 shows yet another embodiment of the present invention to illustrate another manner in which the ATM middleware multicast service 18 may serve as a multicast server. In particular, configuration 50 includes four ATM middleware aware workstations 54, 55, 56, and 57 which associate through switch 58 with ATM middleware service 18. An ATM middleware host, therefore, may send multicast data to ATM middleware service 18. In response, ATM middleware service sends the multicast data to workstations 54, 55, 56 and 57 via switch 58. Preferably, and as FIG. 3 depicts, ATM middleware service 18 resides outside switch 58, however, this may not be desirable for all applications.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A system for transparently mapping user level non-asynchronous transfer mode (non-ATM) sockets to an ATM virtual channel circuit associated with an operating system of a computer, comprising:

an ATM middleware subsystem operable to intercept an extension call associated with the operating system from a non-ATM aware application and, using translation data, translating said extension call to an ATM API call;

an ATM middleware service operable to determine whether an application comprises an ATM -aware application and controlling said ATM middleware subsystem in response to the determination; and a configuration data base accessible through said ATM middleware service and operable to store said translation data for translating said extension call from said non-ATM aware application to said ATM API call.

2. The system of claim 1, further comprising instructions within said ATM middleware for providing quality of service functions to said non-ATM aware application.

3. The system of claim 1, further comprising instructions within said ATM middleware for providing traffic management functions to said non-ATM aware application.

4. The system of claim 1, further comprising instructions within said ATM middleware for providing rate control functions to said non-ATM aware application.

5. The system of claim 1, wherein said extension call from said non-ATM aware application comprises a plurality of binary calls without ATM functionality.

6. The system of claim 1, wherein said ATM middleware subsystem comprises a plurality of dynamic link or shared libraries for accessing a configuration data base.

7. The system of claim 1, wherein said non-ATM aware application, said ATM middleware and said sockets are external to said operating system.

8. A method for transparently mapping user level non-asynchronous transfer mode (non-ATM) sockets to an ATM virtual channel circuit associated with an operating system of a computer, comprising:

intercepting an extention call associated with an operating system from a non-ATM aware application;

translating said extension call to an ATM API;

storing translation data for translating said extension call into said ATM API call and accessing translation data stored in a configuration database, and controlling an ATM middleware subsystem in response thereto.

9. The method of claim 8, further comprising the step of providing quality of service functions to said non-ATM aware application.

10. The method of claim 8, further comprising the step of providing traffic management functions to said non-ATM aware application.

11. The method of claim 8, further comprising the step of providing rate control functions to said non-ATM aware application.

12. The method of claim 8, wherein determining whether said application comprises an ATM aware application comprises accessing translation data stored in a configuration database.

13. The method of claim 8, further comprising the steps of storing translation data for translating said extension call into said ATM API call and accessing said translation data using a shared library.

14. The method of claim 8, further comprising the step of generating a TCP formatted call to an operating system from said non-ATM API call according to a preexisting protocol associated with said operating system.

15. The method of claim 8, further comprising the step of generating a UDP formatted call to said operating system from said non-ATM API call according to a preexisting UDP protocol associated with said operating system.

16. The method of claim 8, further comprising the step of determining whether an application comprises an ATM aware application.

17. The method of claim 8, further comprising the step of generating protocol-specific formatted calls to said operating system from said non-ATM API call according to a preexisting protocol associated within said ATM middleware.

18. The method of claim 8, further comprising the step of operating said non-ATM application and a winsocket application externally to said operating system and operating an ATM middleware internal to said operating system.

19. A method for transparently mapping a non-asynchronous transfer mode (non-ATM) application programming interface (API) call to an ATM API call comprising:

intercepting, at an ATM middleware, a non-ATM API call associated with an operating system from a non-ATM aware application;

determining whether a remote application is ATM aware;

Translating said non-ATM API call into ATM API call and communicating said ATM API call over an ATM communication link to said remote application in response to determining that said remote application is ATM aware;

storing translation data for translating said extension call into said ATM API call and accessing translation data stored in a configuration database; and communicating said non-ATM API call over a non-ATM communication link to said remote application in response to determining that said remote application is non-ATM aware.

\* \* \* \* \*